United States Patent
Watanabe et al.

(10) Patent No.: US 7,965,069 B2
(45) Date of Patent: *Jun. 21, 2011

(54) POWER CONVERTER AND MULTIPORT POWER CONVERTER

(75) Inventors: Yasuto Watanabe, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

This patent is subject to a terminal disclaimer.

(21) Appl. No.: 12/076,514

(22) Filed: Mar. 19, 2008

(65) Prior Publication Data
US 2008/0238383 A1   Oct. 2, 2008

(30) Foreign Application Priority Data

Mar. 19, 2007   (JP) ................................. 2007-070810

(51) Int. Cl.
G05F 1/575 (2006.01)
H02H 3/20 (2006.01)
(52) U.S. Cl. .......................... 323/284; 323/271; 361/90
(58) Field of Classification Search .................. 323/224, 323/225, 259, 271, 282, 284, 285, 344; 363/59, 363/60; 327/536; 361/18, 90
See application file for complete search history.

(56) References Cited

U.S. PATENT DOCUMENTS

| 4,805,063 | A | * | 2/1989 | Kataoka et al. | 361/16 |
| 5,406,471 | A | * | 4/1995 | Yamanaka | 363/124 |
| 7,084,638 | B1 | * | 8/2006 | Kramer et al. | 324/548 |
| 7,292,462 | B2 | * | 11/2007 | Watanabe et al. | 363/60 |
| 7,372,682 | B2 | * | 5/2008 | Chapuis | 361/62 |
| 7,626,343 | B2 | * | 12/2009 | Ger et al. | 315/291 |

FOREIGN PATENT DOCUMENTS

| JP | 3182921 | 8/1991 |
| JP | 2005224060 | 8/2005 |
| JP | 2006325694 | 12/2006 |

* cited by examiner

Primary Examiner — Gary L Laxton
(74) Attorney, Agent, or Firm — Squire, Sanders & Dempsey (US) LLP

(57) ABSTRACT

The DC/DC converter is that which is constituted so as to have a failure detecting circuit in which a first capacitor and a second capacitor are connected in series, a plurality of switches are switched according to a predetermined operating mode to select an inductor, the first capacitor and the second capacitor, allowing them to function, thereby performing any one of the boost, buck, and conducting operations of input voltage.

15 Claims, 12 Drawing Sheets

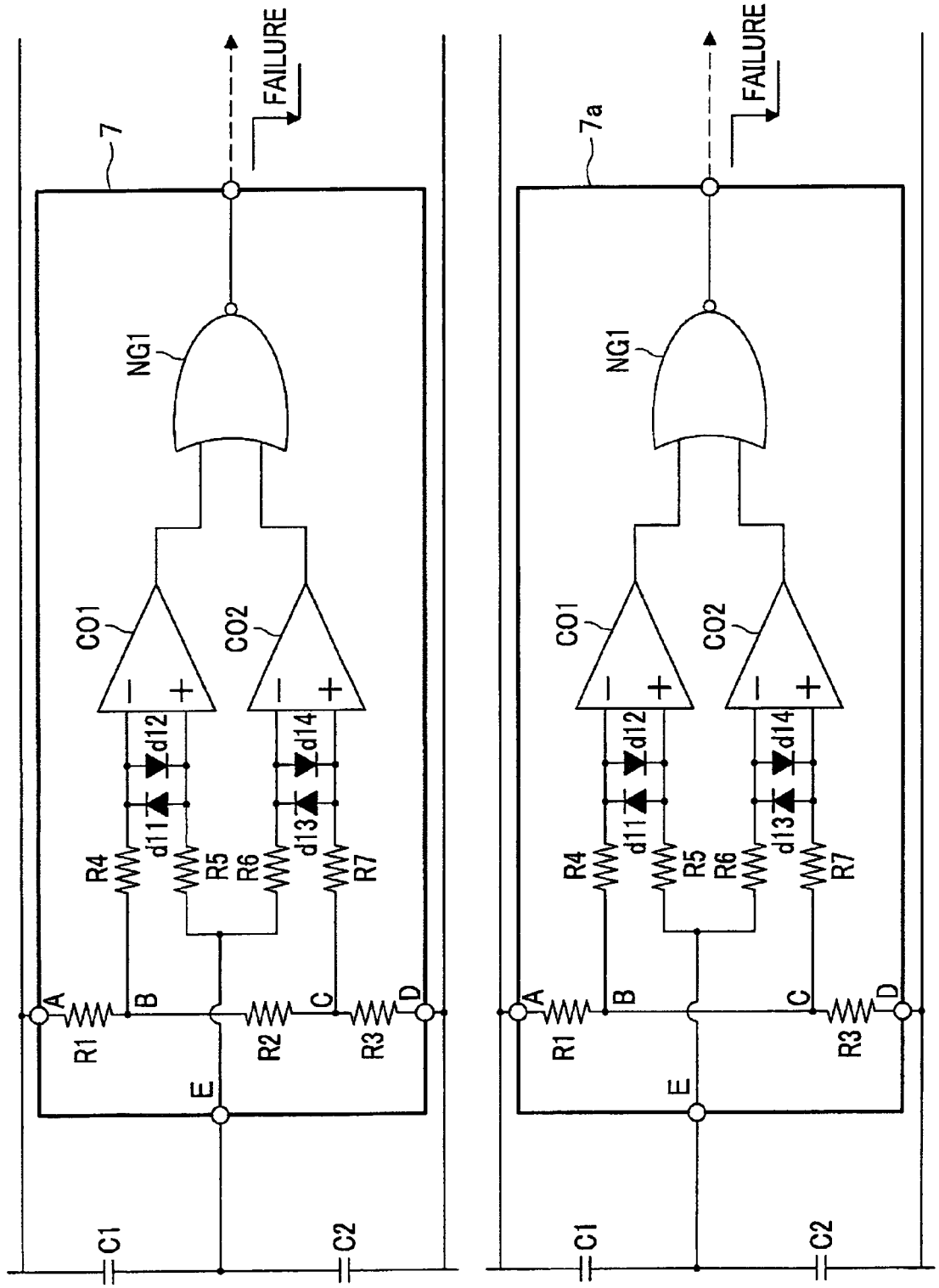

C2 CHARGING OPERATION

SW2 GATE WAVEFORM
I1: C2 CHARGING CURRENT (L MAGNETICALLY STORING)
I2: L DISCHARGING CURRENT (C1, C2 CHARGING)
t1 t2

C1 CHARGING OPERATION

SW3 GATE WAVEFORM
I3: C1 CHARGING CURRENT (L MAGNETICALLY STORING)
I4: L DISCHARGING CURRENT (C1, C2 CHARGING)
t3 t4

CONDUCTING OPERATION
(ONE TIMES BOOST)

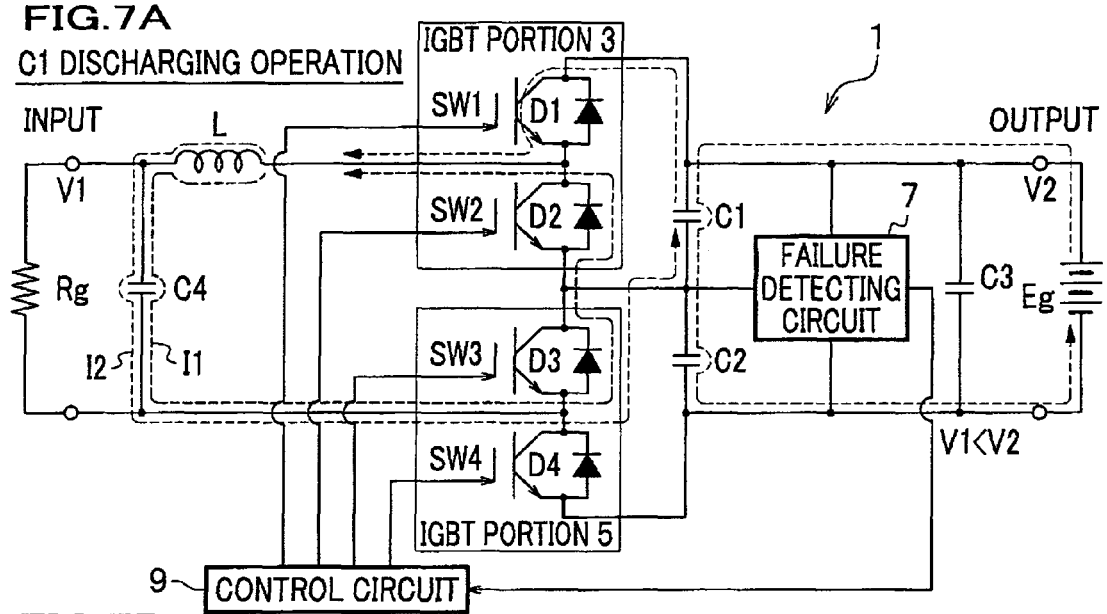
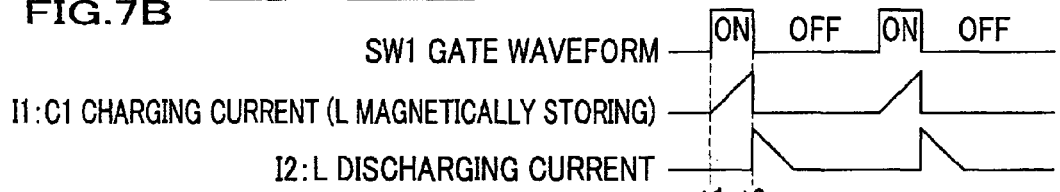
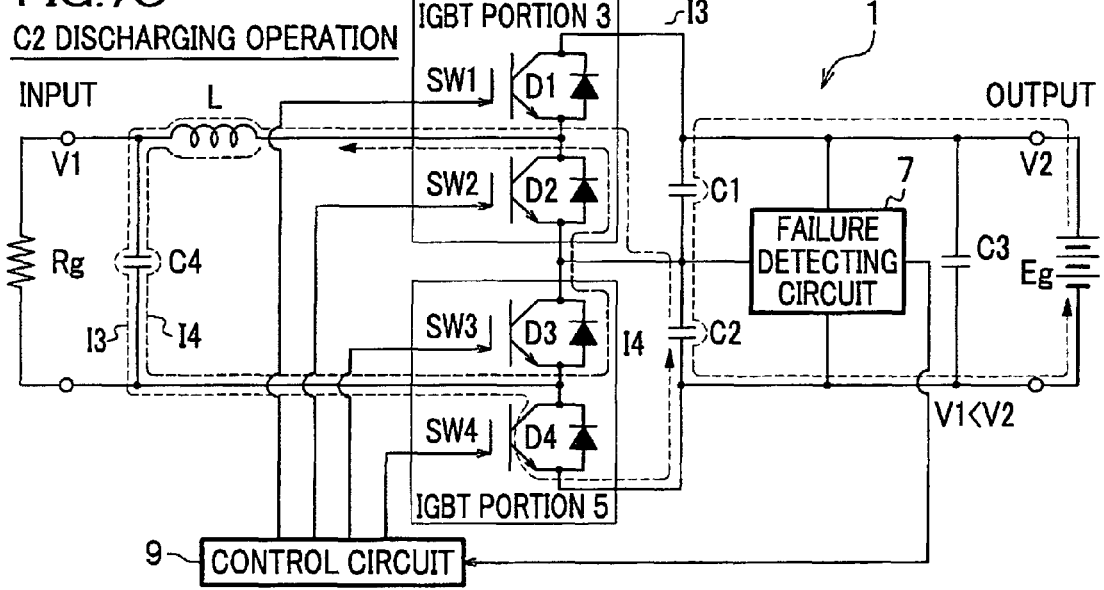
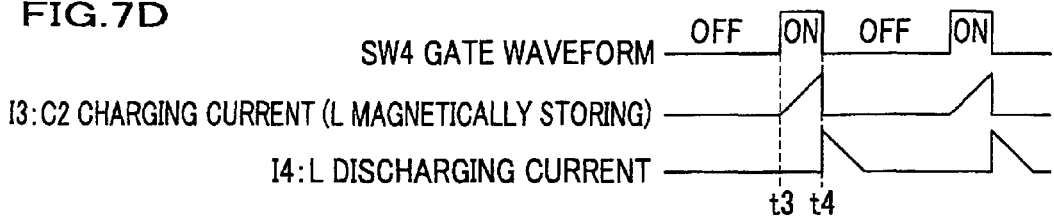

C1, C2 DISCHARGING OPERATION

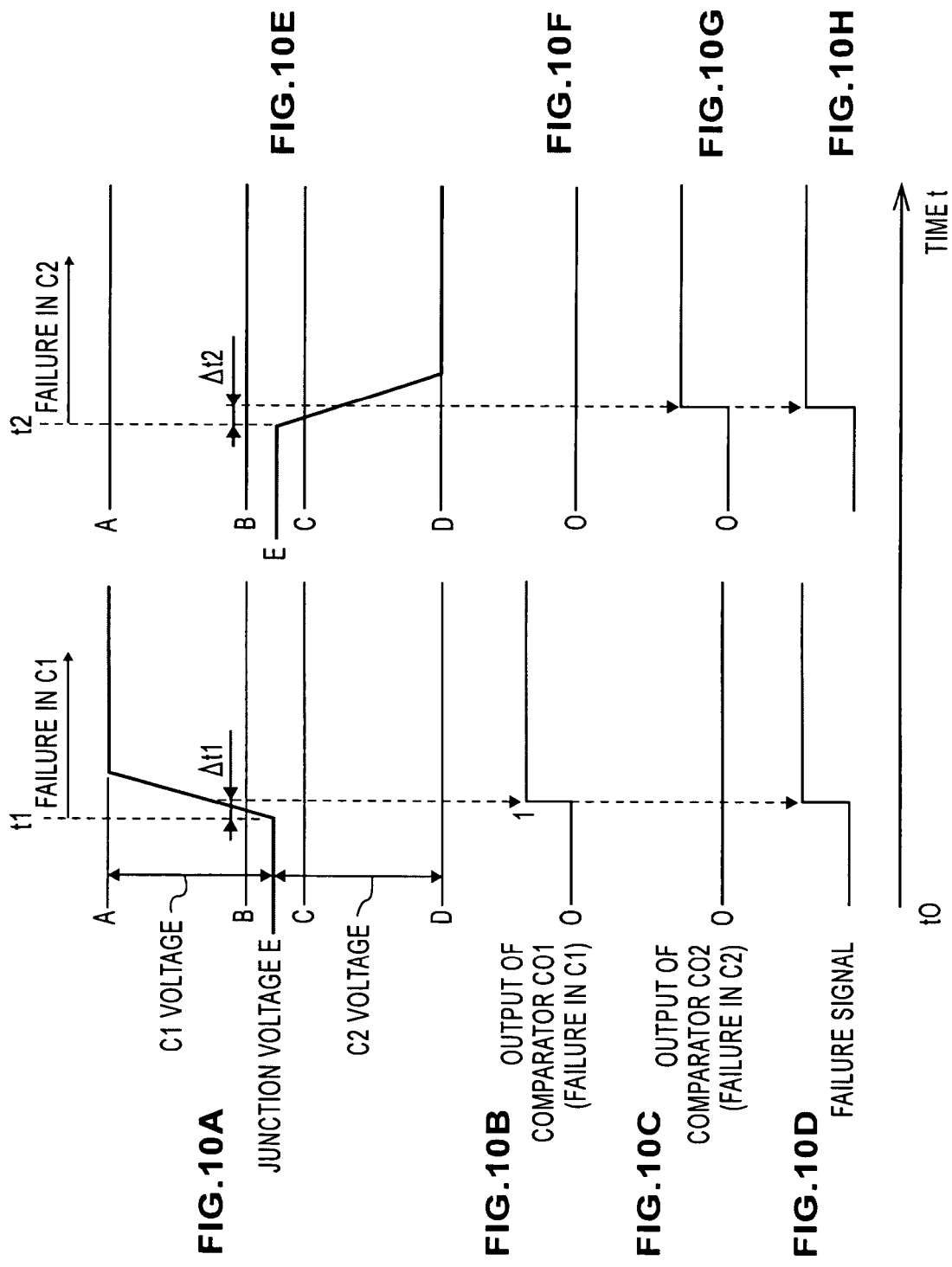

FIG.12A
LOW SIDE GATE IN IGBT 3

FIG.12B
HIGH SIDE GATE IN IGBT 5

FIG.12C L CURRENT

GRADIENT

GRADIENT di/dt=(V1−V2/2)L    V2/2=0 → di/dt=V1/L

VAOLTAGE OF CAPACITORS

POWER CONVERTER AND MULTIPORT POWER CONVERTER

CROSS REFERENCE TO RELATED APPLICATIONS

This application claims the foreign priority benefit under Title 35, United States Code, §119(a)-(d) of Japanese Patent Application No. 2007-070810, filed on Mar. 19, 2007 in the Japan Patent Office, the disclosure of which is herein incorporated by reference in its entirety.

BACKGROUND OF THE INVENTION

1. Field of the Invention

The present invention relates to a power converter and a multiport power converter for boosting, bucking down, or regenerating input voltage.

2. Description of the Related Art

As a conventional power converter for boosting, bucking down, or regenerating the input voltage, a DC/DC converter has been disclosed by JP2005-224060A.

The DC/DC converter disclosed by JP2005-224060A is based on switched capacitance and switched so as to allow inductors and capacitors to function selectively, thereby performing any one of the operations of boosting, bucking, and regeneration of voltage.

Further, a power supply device for detecting the output voltage of a plurality of power converters to stabilize the output voltage has been disclosed by JP3182921.

In addition, a DC/DC converter described by JP2006-325694A is such that which has capacitors in common by a plurality of power conversion circuits, thereby miniaturizing a multiport power converter.

However, in the power converter disclosed in JP2005-224060A, on occurrence of overload or overvoltage in performing the operations of boosting, bucking-down and regeneration of voltage, a capacitor is subjected to overload, thus resulting in a possible failure of the capacitor. There is a problem that, despite the above possibility, the power converter is provided only with current protection functions and failure detection based on the current protection functions is unable to detect short circuits of the capacitor, which take place on failure of the capacitor. Further, the power supply device disclosed in JP3182921 can stabilize output voltage. However, it is provided with an individual power converter module for each power converter, thus making it impossible to miniaturize the device as a whole. This is another problem.

SUMMARY OF THE INVENTION

A first aspect of the present invention provides a power converter including: switches; first and second capacitors connected in series; and a control circuit for controlling switching of the switches between ON and OFF to perform any one of a boost operation, a buck operation, and a conducting operation, of an input voltage; and a failure detecting circuit for detecting a voltage at a junction of the first and second capacitors connected in series and generating a failure signal when the detected voltage is higher than a predetermined voltage range and when the voltage is lower than a predetermined voltage range, the control circuit stopping the boost operation and the buck operation in response to the failure signal.

According to the first aspect, the power converter uses the failure detecting circuit, thereby detecting the junction voltage, which is a voltage at the junction between the first capacitor and the second capacitor connected in series, and outputting a failure signal for stopping the boost operation or the buck operation of the thus input voltage in a case where a value of the detected voltage is higher or lower than a range of values set in advance.

A second aspect provides a power converter provides a power converter including: a first input/output circuit; first and second capacitors connected in series; a second input/output circuit connected to the first and second capacitors; an inductor connected to either of a positive terminal side or a negative terminal side of the first input/output circuit; a first switch for selectively connecting a positive terminal side of the first input/output circuit to a positive terminal of the first capacitor and a positive terminal side of the second input/output circuit; a second switch for selectively connecting the positive terminal of the first input/output circuit to a negative terminal of the first capacitor and a positive terminal of the second capacitor; a third switch for selectively connecting a negative terminal side of the first input/output circuit to the negative terminal of the first capacitor and the positive terminal of the second capacitor; a fourth switch for selectively connecting the negative terminal side of the first input/output circuit to a negative terminal of the second capacitor and the negative terminal side of the second input/output circuit; a control circuit for controlling switching of the first to fourth switches between ON and OFF in any one of operations including a boost operation and a buck operation, of an input voltage; and a failure detecting circuit for detecting a voltage at a junction of the first and second capacitors connected in series and generating a failure signal when the voltage is higher than a predetermined voltage range and when the voltage is lower than a predetermined voltage range, the control circuit stopping the boost operation and the buck operation in response to the failure signal.

According to the second aspect, the power converter uses the failure detecting circuit for detecting the voltage which is a potential at a junction between the first capacitor and the second capacitor connected in series, thereby outputting a failure signal of stopping the boost operation and buck operation of the input voltage in a case where a value of the detected junction voltage is higher or lower than the predetermined range.

A third aspect provides a power converter including: an input circuit; first and second capacitors connected in series; an output circuit connected to the first and second capacitors; an inductor connected to either of a positive terminal side or a negative terminal side of the input circuit; a first switch for selectively connecting a positive terminal side of the input circuit to a positive terminal of the first capacitor and a positive terminal of the second capacitor; a second switch for selectively connecting a negative terminal side of the input circuit to the negative terminal of the first capacitor and the positive terminal of the second capacitor; a control circuit for controlling switching of the first and second switches between ON and OFF in a boost operation of an input voltage; and a failure detecting circuit for detecting a voltage at a junction of the first and second capacitors connected in series and generating a failure signal when the voltage is higher than a predetermined voltage range and when the voltage is lower than a predetermined voltage range, the control circuit stopping the boost operation.

A fourth aspect provides a power converter provides power converter including: an output circuit; first and second capacitors connected in series; an input circuit connected to the first and second capacitors: an inductor connected to either of a positive terminal side or a negative terminal side of the output circuit; a first switch for selectively connecting the positive terminal side of the output circuit to a positive terminal of the first capacitor and a positive terminal side of the input circuit; a second switch for selectively connecting the negative terminal side of the output circuit to a negative terminal of the first capacitor and a negative terminal side of the input circuit; a control circuit for controlling switching of the first and second switches between ON and OFF in a buck operation of an input voltage; and a failure detecting circuit for detecting a voltage at a junction of the first and second capacitors connected in series and generating a failure signal when the voltage is higher than a predetermined voltage range and when the voltage is lower than a predetermined voltage range, the control circuit stopping the buck operation in response to the failure signal.

According to the fourth aspect, the power converter uses the failure detecting circuit, detecting the junction voltage, which is a potential at a junction between the first capacitor and the second capacitor connected in series, thereby outputting the failure signal for stopping the boost operation of the input voltage in a case where a value of the thus detected junction voltage is higher or lower than the predetermined range.

A fifth aspect provides a power converter based on the first aspect, wherein the control circuit performs the conducting operation of the input voltage in response to the failure signal.

According to the fifth aspect, the power converter uses the control circuit to give such a control as to perform the conducting operation with the boost operation or buck operation of voltage being stopped.

A sixth aspect provides a multiport power converter including: at least two input/output circuits; a plurality of capacitors; a plurality of inductors; a plurality of power converting circuits, including switches; a control circuit for controlling switching of the switches in accordance with predetermined switching patterns to perform a plurality of operation modes to selectively use the inductors and the capacitors to perform any one of a boost operation, a buck operation, and a conducting operation, wherein the capacitors are shared among the power converting circuits; and a failure detecting circuit for detecting a voltage at a junction between two of the capacitors and generating a failure signal when the voltage is higher than a predetermined voltage range and when the voltage is lower than a predetermined voltage range, the control circuit stopping the boost operation and the buck operation in response to the failure signal.

According to the sixth aspect, the multiport power converter uses the failure detecting circuit, detecting the junction voltage, which is a potential at any junction between the capacitors connected in series, thereby outputting a failure signal for stopping the boost operation or the buck operation of the thus input voltage in a case where a value of the thus detected junction voltage is higher or lower than a predetermined range.

A seventh aspect provides a multiport power converter including: at least two input/output circuits; a capacitor unit; a plurality of inductors; and a plurality of power converting circuits, wherein the capacitor unit is shared among the power converting circuits, wherein at least one of the power converting circuits comprises a buck-boost power converting circuit, wherein the input/output circuits comprises first and second input/output circuits, wherein the capacitor unit comprises a first and second capacitors connected in series, wherein buck-boost power converting circuit comprises: a first switch for selectively connecting a positive terminal side of the first input/output circuit to a positive terminal of the first capacitor and a positive terminal side of the second input/output circuit; a second switch for selectively connecting the positive terminal side of the first input/output circuit to a negative terminal of the first capacitor and a positive terminal of the second capacitor; a third switch for selectively connecting a negative terminal side of the first input/output circuit to the negative terminal of the first capacitor and the positive terminal of the second capacitor; and a fourth switch for selectively connecting the negative terminal side of the first input/output circuit to a negative terminal of the second capacitor and the negative terminal side of the second input/output circuit, the multiport power converter further comprising: a control circuit for controlling switching of the first to fourth switches between ON and OFF in any one of operations including a boost operation and a buck operation, of an input voltage; and a failure detecting circuit for detecting a voltage at a junction of the first and second capacitors connected in series and generating a failure signal when the voltage is higher than a predetermined voltage range and when the voltage is lower than a predetermined voltage range, the control circuit stopping the boost operation and the buck operation in response to the failure signal.

According to the seventh aspect, in the multiport power converter, at least one of the power conversion circuits is a buck-boost circuit and the failure detecting circuit is used to detect a junction voltage, which is a potential at a junction between the first capacitor and the second capacitor connected in series, thereby outputting a failure signal of stopping the boosting or bucking down of the thus input voltage in a case where a value of the thus detected junction voltage is higher or lower than a range of values set in advance.

An eighth aspect provides a multiport power converter including: at least two input/output circuits; a capacitor unit; a plurality of inductors; a plurality of power converting circuits, including switches; and a control circuit for controlling switching of the switches in accordance with predetermined switching patterns to perform a plurality of operation modes to selectively use the inductors and the capacitor unit to perform any one of operations including a boost operation, a buck operation, and a conducting operation, wherein the capacitor unit is shared among the power converting circuits, wherein at least one of the power converting circuits comprises a boost power converting circuit, wherein the input/output circuits comprises first and second input/output circuits, wherein the capacitor unit comprises a first and second capacitors connected in series, wherein the switches comprises: a first switch for selectively connecting a positive terminal side of the first input/output circuit to a negative terminal of the first capacitor and a positive terminal of the second capacitor; a second switch for selectively connecting the negative terminal side of the first input/output circuit to a negative terminal of the first capacitor and a positive terminal of the second capacitor, the multiport power converter further including: a control circuit for controlling switching of the first and second switches between ON and OFF for a boost operation; and a failure detecting circuit for detecting a voltage at a junction of the first and second capacitors connected in series and generating a failure signal when the voltage is higher than a predetermined voltage range and when the voltage is lower than a predetermined voltage range, the control circuit stopping the boost operation.

According to the eighth aspect, at least one of the power conversion circuits is a boost power converting circuit, and the failure detecting circuit detects the junction voltage, which is a potential at a midpoint between the first capacitor and the second capacitor connected in series, thereby outputting a failure signal of stopping the boosting of the thus input voltage in a case where a value of the thus detected junction voltage is higher or lower than a range of values set in advance.

A ninth aspect provides a multiport power converter including: at least two input/output circuits; a capacitor unit; a plurality of inductors; a plurality of power converting circuits, including switches; and a control circuit for controlling switching of the switches in accordance with predetermined switching patterns to perform a plurality of operation modes to selectively use the inductors and the capacitor unit to perform any one of operations including a boost operation, a buck operation, and a conducting operation, wherein the capacitor unit is shared among the power converting circuits, wherein at least one of the power converting circuits comprises a buck power converting circuit, wherein the input/output circuits comprises first and second input/output circuits, wherein the capacitor unit comprises a first and second capacitors connected in series, wherein the switches comprises: a first switch for selectively connecting a positive terminal side of the first input/output circuit to a positive terminal of the first capacitor and a positive terminal side of the second input/output circuit; and a second switch for selectively connecting a negative terminal side of the first input/output circuit to a negative terminal of the second capacitor and a negative terminal side of the second input/output circuit, the multiport power converter further including: a control circuit for controlling switching of the first and second switches between ON and OFF; and a failure detecting circuit for detecting a voltage at a junction of the first and second capacitors connected in series and controlling the control circuit to stop a buck operation when the voltage is higher than a predetermined voltage range and when the voltage is lower than a predetermined voltage range.

According to the ninth aspect, in, at least one of the power conversion circuits is a buck power converting circuit and the failure detecting circuit detects the junction voltage, which is a potential at a midpoint between the first capacitor and the second capacitor connected in series, thereby outputting the failure signal of stopping the bucking down of the thus input voltage in a case where a value of the thus detected junction voltage is higher or lower than a predetermined range.

A tenth aspect provides a multiport power converter based on the sixth aspect, wherein the control circuit performs the conducting operation of the input voltage in response to the failure signal.

According to the tenth aspect, the multiport power converter uses the control circuit to control so as to perform the conducting operation to stop the boost operation or the buck operation.

BRIEF DESCRIPTION OF THE DRAWINGS

The object and features of the present invention will become more readily apparent from the following detailed description taken in conjunction with the accompanying drawings in which:

FIGS. 2A and 2B are schematic circuit diagram showing the details of failure detecting circuits for the power converter given in FIG. 1;

FIGS. 7A to 7D are drawings for explaining the details of the buck operation;

FIGS. 10A to 10H are drawings showing a temporal relationship between the transition of junction voltage, the output of two comparators and the stop output;

FIGS. 12A to 12C are drawings for explaining a case where any failure is detected with reference to change in current.

The same or corresponding elements or parts are designated with like references throughout the drawings.

DETAILED DESCRIPTION OF THE INVENTION

The present invention provides a power converter and a multiport power converter (multiple input/output power converter) capable of detecting a short circuit of a capacitor and also stabilizing the output voltage.

The present invention provides a power converter and a multiport power converter, which can detect a short circuit (failure) of a capacitor with reference to the results of the detected voltage between capacitors connected in series in the power converter. Further, the present invention provides a multiport power converter with detecting a short circuit of a capacitor on the basis of only one failure detecting circuit. Then, a failure is detected to stop the boosting or bucking down of voltage, thus making it possible to stabilize the output voltage.

Embodiment

With reference to drawings will be described embodiments of the present invention.

First will be described a circuit structure of the power converter, then the boost and buck operations, and an operation on failure detection, a circuit of a multiport power converter and also appendix (explanation of impossibility in detecting a failure by using electric current).

[Circuit Structure of Power Converter]

Figure 1:
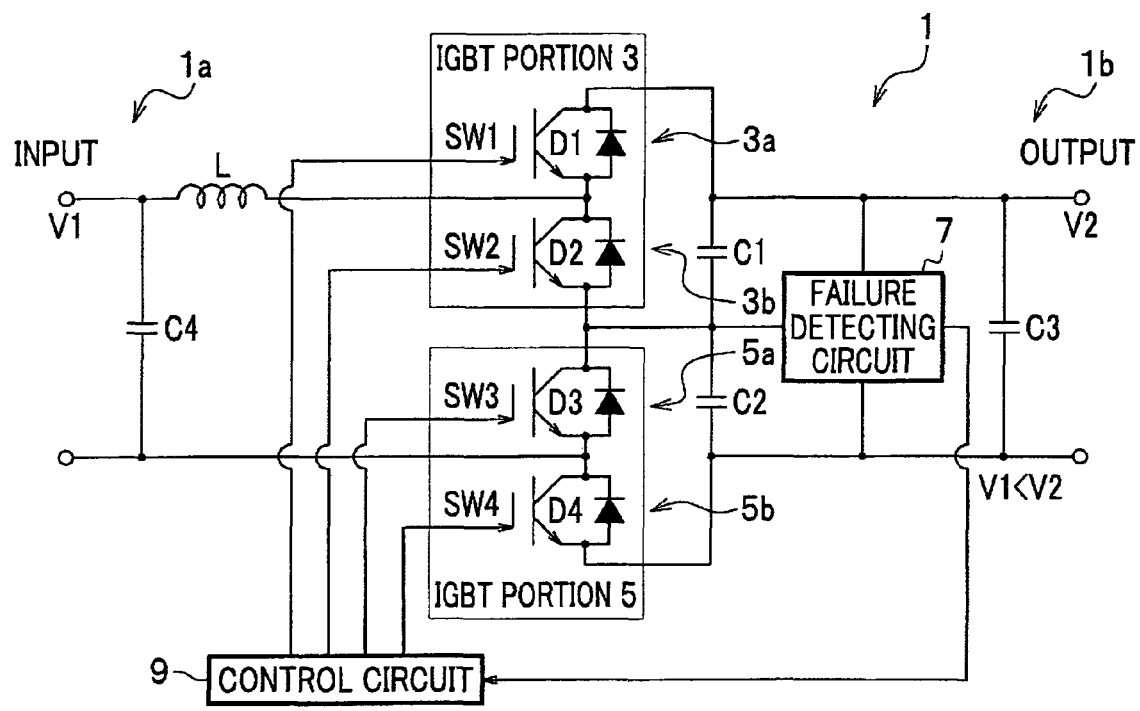
FIG. 1 is a schematic circuit diagram of a power converter (DC/DC converter) of the embodiment in the present invention.

FIG. 1 is a schematic circuit diagram of a DC/DC converter (power converter). As shown in FIG. 1, a DC/DC converter 1 outputs an input voltage through boosting, bucking down and conduction. The converter is provided with a DC power-supply input circuit (power supply voltage V1), an outputting circuit (output voltage V2), a smoothing capacitor (electrolysis capacitor) C4 on the input side, an inductor L, an IGBT portion 3 containing two (pair) IGBT elements, an IGBT portion 5, capacitors C1, C2, C3, a failure detecting circuit (failure detecting circuit) 7 and a control circuit 9.

When outputting the thus input voltage through boosting, bucking down and conduction, the DC/DC converter 1 detects a short circuit (failure) of any of the capacitor C1 and the capacitor C2, thus making it possible to stop a boost operation or a buck operation.

The DC power supply input circuit 1a is connected to a power supply (not shown) on the boost operation and includes terminals for receiving a power supply voltage V1, which is direct current, and outputting a voltage bucked-down on the buck operation. The outputting circuit 1b includes a terminal for outputting an output voltage V2 boosted on the boost operation. Here, the elements 1a and 1b are referred to as the input circuit and the outputting circuit, respectively, on the basis of the boost operation, but they are reversed on the buck operation.

The smoothing capacitor (electrolysis capacitor) C4 is installed for decreasing the impedance of the power supply (not shown) connected on the boost operation. For example, where the power supply is apart from the DC/DC converter 1 to require a long power-supply wiring from the power supply to the DC power supply input circuit, an impedance of the power supply at the DC power supply input circuit 1a may be increased, which may result in a control failure. The electrolysis capacitor C4 can prevent the control failure.

The inductor L is to store a magnetic energy on the boost operation or the buck operation. The inductor L also functions as an inductor of a voltage reducer on the boost operation in a reverse direction.

Thereby, the DC/DC converter 1 can buck down the regenerated electric power from a motor. For example, where a DC power supply input circuit is connected to a secondary battery and the motor is connected to an output side, the DC/DC converter 1 returns the regenerated electric power to the secondary battery.

The IGBT portion 3 includes an IGBT element SW1 and a flywheel diode D1 on the upper side 3a of the IGBT portion 3, and an IGBT element SW2 and a flywheel diode D2 on the lower side 3b of the IGBT portion 3.

The IGBT portion 5 includes an IGBT element SW3 and a flywheel diode D3 on the upper side 5a of the IGBT portion 5, and an IGBT element SW4 and a flywheel diode D4 on the lower side 5b of the IGBT portion 5.

The capacitors C1, C2, C3 comprise ceramic capacitors and are subjected to charging and discharging by switching by the IGBT element SW1 and the IGBT element SW2 at the IGBT portion 3 and by the IGBT element SW3 and the IGBT element SW4 at the IGBT portion 5. Further, the capacitor C1 (first capacitor) and the capacitor C2 (second capacitor) are connected in series, and a potential of the serially connected wire (junction voltage) is detected by a failure detecting circuit 7. In addition, the use of a ceramic capacitor makes it possible to further miniaturize a device, with the efficiency kept equal to or higher than that of a film capacitor.

The failure detecting circuit 7 detects a junction voltage and outputs a failure signal for stopping the boost or buck operation of the input voltage in a case where a value of the thus detected junction voltage is higher or lower than a predetermined range of values. The failure detecting circuit 7 will be described in detail with reference to FIG. 2A.

As shown in FIG. 2A, the failure detecting circuit 7 is provided with a resistor R1, a resistor R2, a resistor R3, a resistor R4, a resistor R5, a resistor R6, a resistor R7, a diode d11, a diode d12, a diode d13, a diode d14, a comparator CO1, a comparator CO2, and a NOR gate NG1.

The resistor R1 is connected at one end to a point A, which is a connecting point with the capacitor C1 and at the other end to a point B, which is a connecting point with the resistor R2 and the resistor R4. The resistor R2 is connected at one end to the point B and at the other end to a point C, which is a connecting point with the resistor R3 and the resistor R7. The resistor R3 is connected at one end to a point C and at the other end to a point D, which is a connecting point with the capacitor C2.

The resistor R4 is connected at one end to the point B and at the other end to an inverting input (denoted with "−") of the comparator CO1. The resistor R5 is connected at one end to a wiring connecting to E Point, which is a connecting point connected to a junction point between the capacitor C1 and the capacitor C2 connected in series and to the one end of the resistor R6 and at the other end to a non-inverting input (denoted with "+") of the comparator CO1. The resistor R6 is connected at one end to a wiring connecting to a point E and to the one end of the resistor R5 and at the other end to an inverting input of the comparator CO2. The resistor R7 is connected at one end to a point C and at the other end to a non-inverting input of the comparator CO2.

The diode d11 is connected at the anode to the other end of the resistor R5 and at the cathode to the other end of the resistor R4, and allows a part of a current flowing into the non-inverted input of the comparator CO1 via the resistor R5 to flow into the inverted input through rectification. The diode d12 is connected at the anode to the other end of the resistor R4 and at the cathode to the other end of the resistor R5, and allows a part of a current flowing into the inverted input of the comparator CO1 via the resistor R4 to flow into the non-inverted input through rectification.

The diode d3 is connected at the anode to the other end of the resistor R7 and at the cathode to the other end of the resistor R6, and allows a part of an electric current flowing through the resistor R7 flowing into the non-inverting input of the comparator CO2 to flow into the non-inverting input of the comparator CO2. The diode d4 is connected at the anode to the other end of the resistor R6 and at the cathode to the other end of the resistor R7, and allows a part of an electric current flowing through the resistor R6 into the inverting input of the comparator CO2 to flow into the non-inverting input of the comparator CO2.

The comparator CO1 outputs a response (comparator CO1 output "1") representing the short circuits (failure) of the capacitor C1 in a case where voltage applied through the resistor R4 and the resistor R5 to the inverting input and the non-inverting input is higher than a predetermined value (upper limit of the set range).

The comparator CO2 outputs a response (comparator CO2 output "1") representing the short circuits (failure) of the capacitor C2 in a case where voltage applied through the resistor R6 and the resistor R7 to the inverting input and the non-inverting input is lower than a predetermined value (lower limit of the set range).

The NOR gate NG1 outputs a failure signal for stopping the boost operation or the buck operation of the electric power converter 1 in a case where a response is outputted from any of the comparator CO1 and the comparator CO2.

Then, the point E, which is a connecting point, is equivalent to a junction point connecting the negative terminal of the capacitor C1 with the positive terminal of the capacitor C2, and given as a junction voltage E for continence sake. Further, a resistance between the point B and the point C is increased in resistance by the resistor R2 connected, thereby expanding a set range. In other words, the resistance of the resistor R2 can be used to establish a voltage range of dead zone for failure detection. Then, a short circuit in the capacitor C1 is detected when the junction voltage E is higher than the set range, and a short circuit in the capacitor C2 is detected when the junction voltage E is lower than the set range (the details will be explained in "operations on failure detection").

In addition, a failure detecting circuit 7a shown in FIG. 2B is provided by removing the resistor R2 from the structure shown in FIG. 2A. Thus, the failure detecting circuit 7a outputs a failure signal indicating a short circuit of the capacitor C1 with the set range being 0. Thus, the failure detecting circuit 7a outputs the failure signal when the detected junction voltage is higher than a predetermined voltage value and the failure signal indicating the short circuit of the capacitor C2 when the detected junction voltage is lower than the predetermined voltage. However, the failure detecting circuit may frequently output the failure signal as it needs. Thus it is desirable to provide the dead zone in the comparators CO1 and CO2.

Returning to FIG. 1, the control circuit 9 switches the IGBT element SW1 and the IGBT element SW2 at the IGBT portion 3 and the IGBT element SW3 and the IGBT element SW4 at the IGBT portion 5 according to a predetermined operating mode (ON/OFF control by changing the gate voltages, the details will be explained later), and also controls the IGBT elements SW1 to SW4 to stop the boost operation and buck operation for performing the conducting operation where the failure signal is inputted from the NOR gate NG1.

(Brief Explanation about the Boost Operation)

Figure 3A:
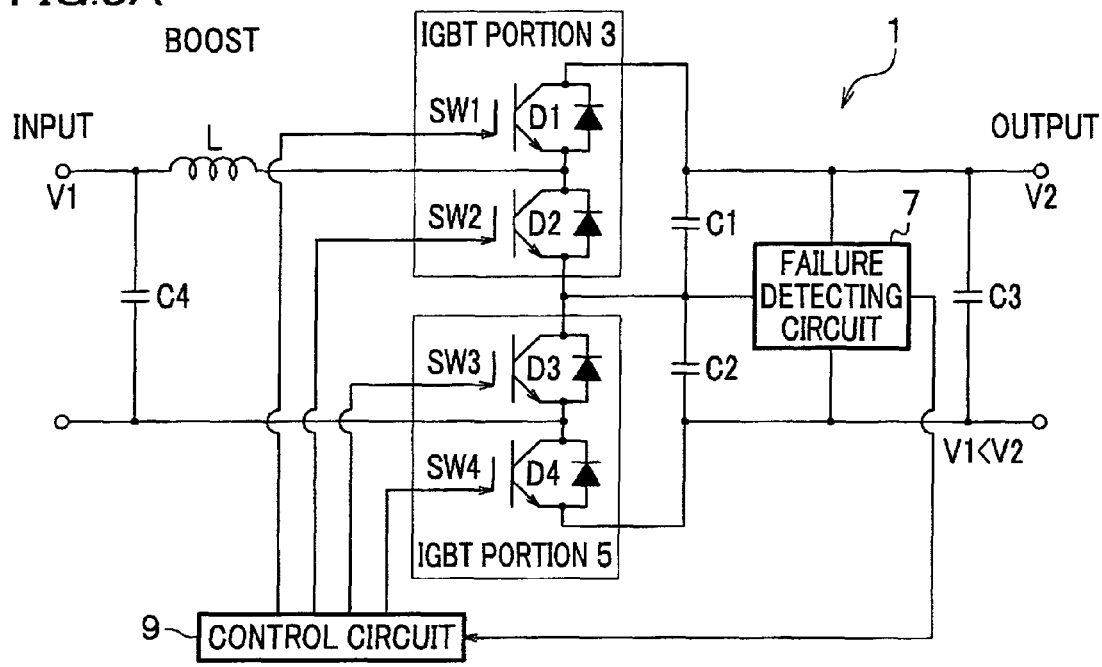
FIGS. 3A to 3C are drawings for explaining an outline of the boost operation.
Figure 3B:
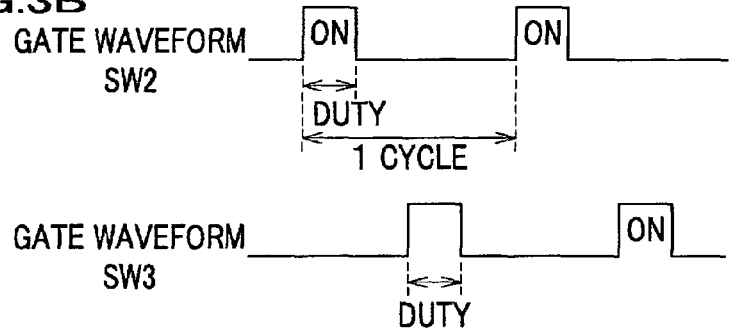
Figure 3C:
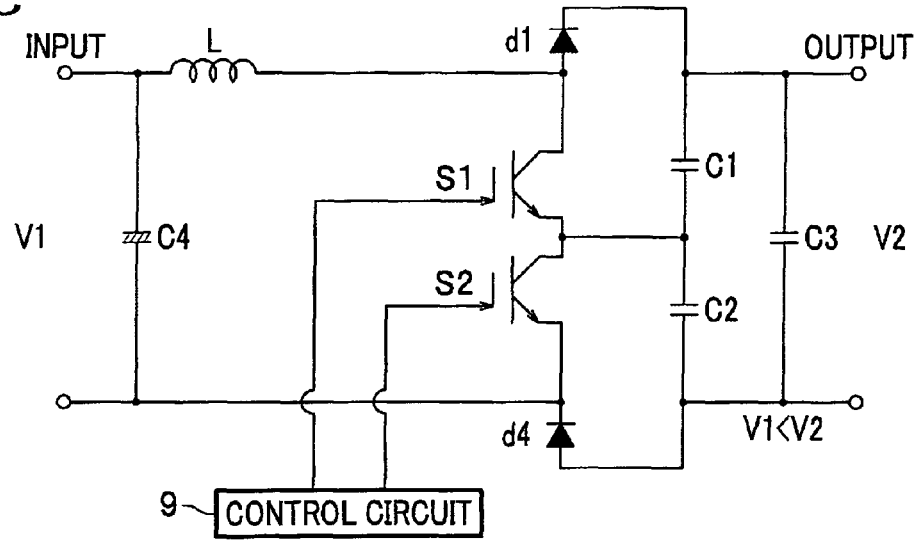

Next, an explanation will be made for the boost operation (mode on the boost operation) of the DC/DC converter 1 shown in FIG. 1 with reference to FIGS. 3A to 3C. Hereinafter, the IGBT element SW1, IGBT element SW2, IGBT element SW3 and IGBT element SW4 are respectively referred to as switch SW1, switch SW2, switch SW3 and switch SW4. The switch SW1 and the switch SW4 are to be always kept OFF. As shown in FIG. 3B, a gate voltage is applied from the control circuit 9 in such a manner that the switch SW2 at the IGBT portion 3 and the switch SW3 at the IGBT portion 5 are alternately turned ON/OFF. In other words, because the switch SW1 and the switch SW4 are always kept OFF, these switches and can be omitted and the failure detecting circuit 7 is further omitted to give a structure as shown in FIG. 3C wherein the switch SW1 is denoted with reference S1; the switch SW3, reference S2; the flywheel diode D1, reference d1; and the flywheel diode D4 with reference d4.

Further, as shown in FIG. 3B, ON time duty for each of the switch SW2 and SW3 is allowed to change from 0% to 50% (in reality, with consideration given to dead time for preventing short circuits of the switch SW1 and the switch SW2, a value of 50% or lower, for example, 45% is recommended), by which the DC/DC converter 1 can output the thus input voltage at a voltage boosted one to two times. In other words, the duty ratio is allowed to change, thus making it possible to change the output voltage to any given value continuously. The details will be explained later.

(Brief Explanation about the Buck Operation)

Figure 4A:
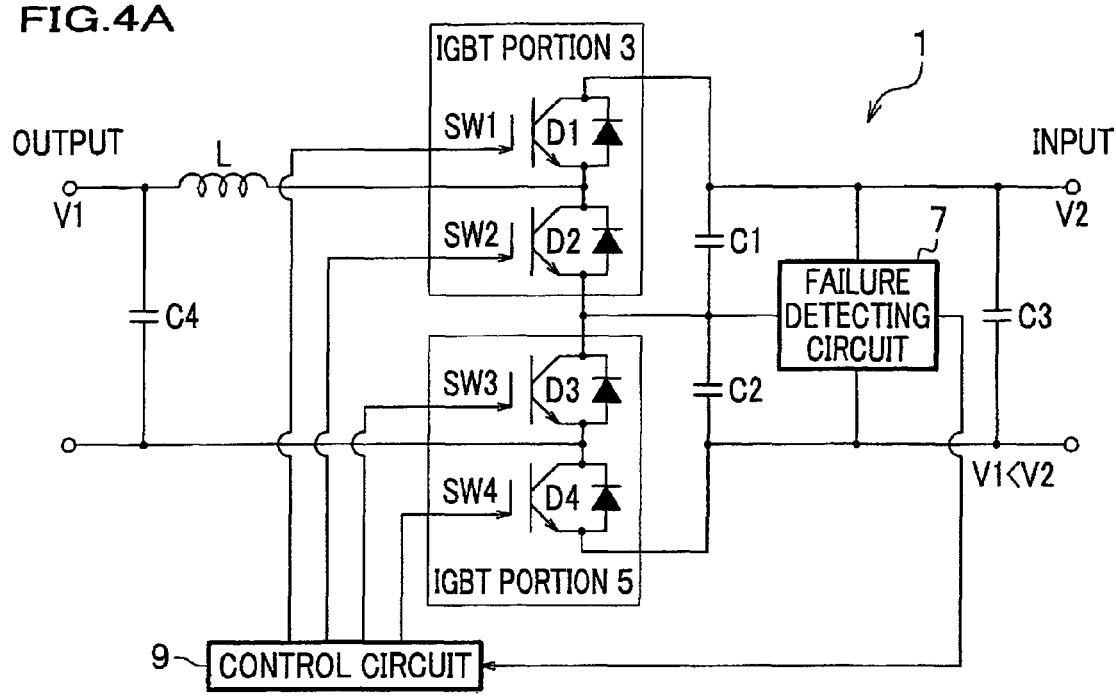
FIGS. 4A to 4C are drawings for explaining an outline of the buck operation.

Next, an explanation will be made for the buck operation of the DC/DC converter 1 shown in FIG. 1 with reference to FIG. 4. In a mode on voltage buck operation (regeneration mode), since electricity is returned from the regeneration loading side, the input and output are reversed as compared with those given in FIG. 3A.

Figure 4B:
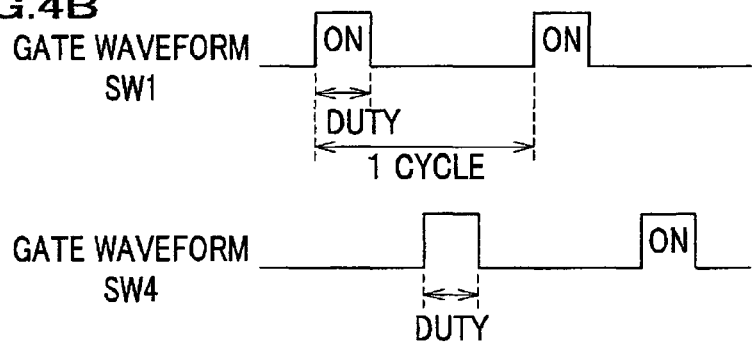
Figure 4C:
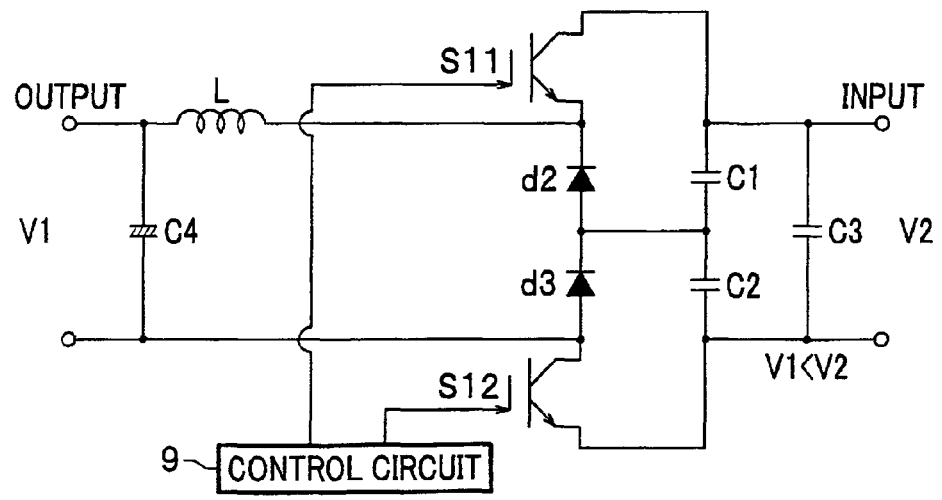

In the voltage buck mode (regeneration mode), the switch SW2 and the switch SW3 are always kept OFF. As shown in FIG. 4B, a gate voltage is applied from the control circuit 9 in such a manner that the switch SW1 at the IGBT portion 3 and the switch SW4 at the IGBT portion 5 are alternately turned ON/OFF. In other words, the switch SW2 and the switch SW3 are always kept OFF, by which these switches can be omitted and the failure detecting circuit 7 is omitted to give a structure as shown in FIG. 4C, wherein the switch SW1 is denoted with reference S11; the switch SW4, reference S12; the flywheel diode D2, reference d2; and the flywheel diode D3 with reference d3.

Further, as shown in FIG. 4B, ON time duty for each of the switch SW1 and SW4 is allowed to change from 0% to 50% (in reality, with consideration given to dead time for preventing short circuits of the switch SW1 and the switch SW2, a value of 50% or lower, for example, 45% is recommended), so that the input voltage (regenerated voltage V2) can be outputted at a voltage bucked down to one to 0.5 times as required. In addition, at a lower voltage bucking down rate, the switch SW4 is always kept ON and only the switch SW1 is turned ON/OFF (this operation will be described later).

Subsequently, an explanation will be made in details for each of the mode operations.

[Detailed Explanation about the Boost Operation]

Figure 5A:
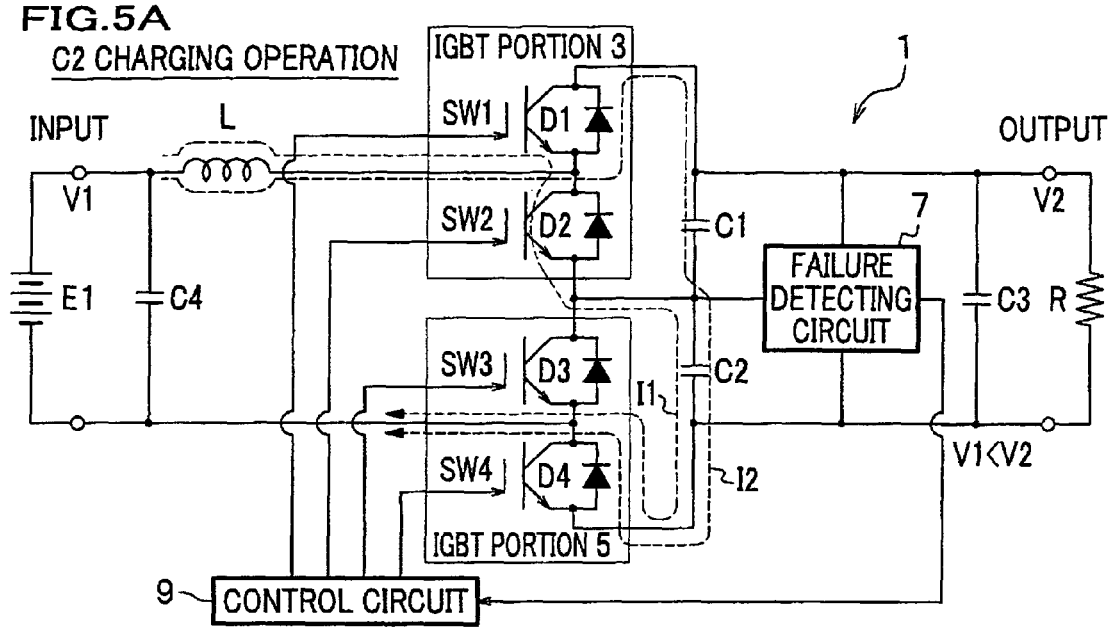
FIGS. 5A to 5D are drawings for explaining the details of the buck operation.
Figure 5B:
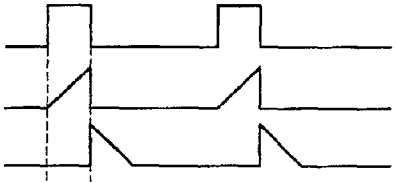
Figure 5C:
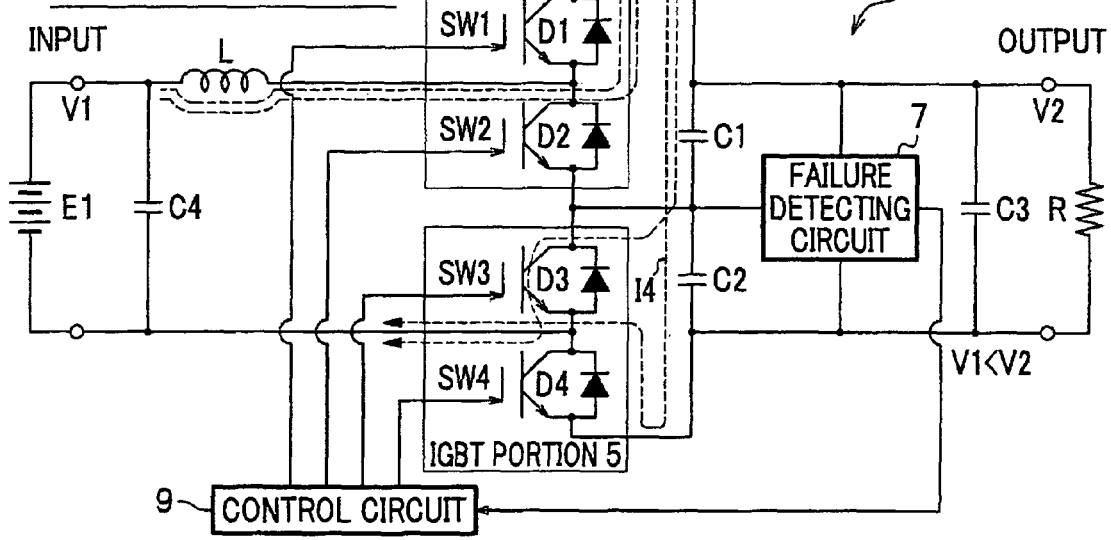
Figure 5D:
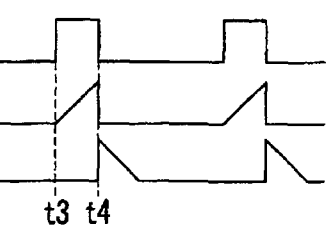

First, will be described the voltage boost operation of the DC/DC converter 1 in the present invention with reference to FIGS. 5A to 5D. In the DC/DC converter 1 of the present invention, the capacitors C1 and C2 are alternately charged and at the same time, a magnetic energy is stored in the inductor L to perform the boost of voltage. FIG. 5A and FIG. 5B show operations where the capacitor C2 is charged, while FIG. 5C and FIG. 5D show operations where the capacitor C1 is charged.

Will be described charging operations of the capacitor C2 with reference to FIG. 5A and FIG. 5B, at time t1, when a gate voltage is applied to the switch SW2 of the IGBT portion 3, the switch SW2 is turned ON (others such as the switch SW1, switch SW3 and switch SW4 are turned OFF), thereby, charging current I1 flows through a route of the power supply E1→the inductor L→the switch SW2→the capacitor C2→the flywheel diode D4→the power supply E1. In this instance, the capacitor C2 is charged by the power supply E1 (see I1: C2 charging current waveform in FIG. 5B). During this, a magnetic energy is stored in the inductor L. Further, since the capacitors C1, C2 are also connected to the capacitor C3 and a load R, the capacitor C3 is charged and an output current also flows to the load R.

Then, at time t2, when the switch SW2 is turned OFF (others such as the switch SW1, switch SW3 and switch SW4 are also turned OFF), charging current I2 resulting from a magnetic energy stored in the inductor L flows through a route of inductor L→flywheel diode D1→capacitor C1→capacitor C2→flywheel diode D4→power supply E1 (see I2: L discharged current waveform in FIG. 5B).

Further, will be described charging operations of the capacitor C1. With reference to FIG. 5C and FIG. 5D, at time t3, when a gate voltage is applied to the switch SW3 of the IGBT portion 5, turning the switch SW3 ON (others such as the switch SW1, switch SW2 and switch SW4 are turned OFF), a charging current I3 flows through a route of the power supply E1→the inductor L→the flywheel diode D1→the capacitor C1→the switch SW3→the power supply E1. In this instance, the capacitor C1 is charged by the power supply E1 (see I3: C1 charging current waveform in FIG. 5D). At this time, a magnetic energy is stored in the inductor L. Further, since the capacitors C1, C2 are also connected to the capacitor C3 and a load R, the capacitor C3 is charged and an output current also flows to the load R.

Then, at time t4, when the switch SW3 is turned OFF (others such as the switch SW1, switch SW2 and switch SW4 are also turned OFF), a charging current I4 stored in the inductor L flows through a route of the inductor L→the flywheel diode D1→the capacitor C1→the capacitor C2→the flywheel diode D4→the power supply E1 (see I4: L discharged current waveform in FIG. 5D).

As described above, in the DC/DC converter 1, the charging currents (I1 and I3) are allowed to flow alternately from the power supply E1 to the two capacitors C1, C2 connected in series, and the charging currents (I1 and I3) to the capacitors C1, C2 are used to store a magnetic energy in the inductor L. This allows the discharged currents (I2 and I4) of the inductor L to be used to charge the capacitors C1, C2, thus providing the boost operation.

Further, as previously shown in FIG. 3B, ON time duty for each of the switch SW2 and SW3 is allowed to change from 0% to 50% (in reality, in consideration with dead time for preventing short circuits of the switch SW2 and the switch SW3, a value is 50% or lower, for example, 45% is desirable). This allows the input voltage to be outputted at the voltage boost one to two times. In other words, the duty ratio can be changed, by which the charging current from the power supply E1 to the capacitors C1, C2 and the discharged current from the inducer L are controlled (adjusted), thus making it possible to vary the output voltage to any given value continuously.

Figure 6A:
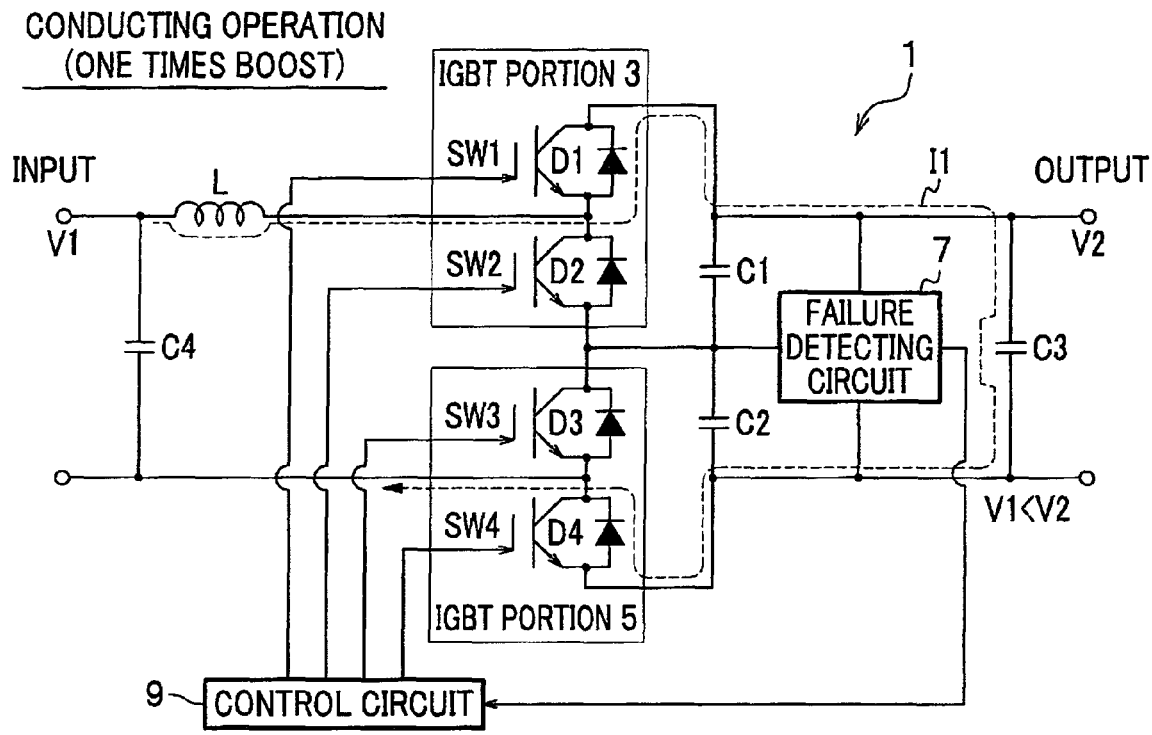
FIGS. 6A and 6B are drawings for showing an example where the power converter operates as an ordinary rectifying circuit.
Figure 6B:
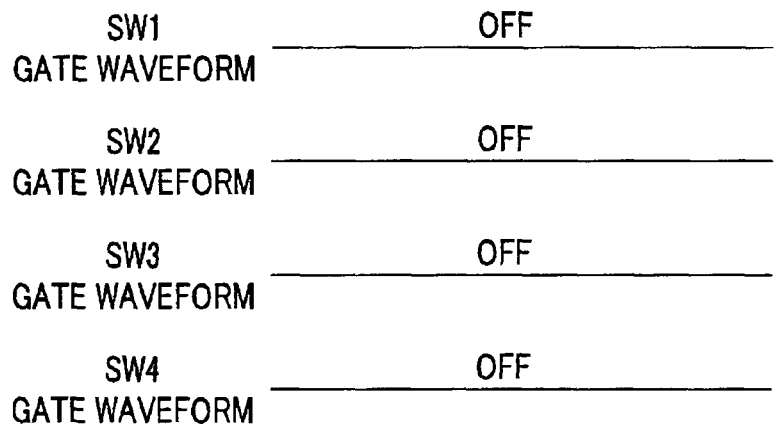

In addition, the DC/DC converter 1 can function not only as a voltage boost circuit but also as a rectifying circuit. FIGS. 6A and 6B show an example in which the switch SW1, switch SW2, switch SW3 and switch SW4 are always kept OFF and operated as an ordinary rectifying circuit (a conduction circuit, or 1-time voltage boost circuit).

Then, in the DC/DC converter 1, when the switch SW1 to the switch SW4 are stopped for switching, the current I1 flows to the load R from the power supply E1 through a current route of the inductor L, the flywheel diode D1 of the IGBT portion 1, the load R, and flywheel diode D4. In this instance, the capacitors C1, C2 do not contribute to the voltage boosting, and the output voltage is about one time the input voltage.

[Detailed Explanation about Voltage Step-Down Operation]

Next, will be described the buck operation of the DC/DC converter 1 in the present invention with reference to FIGS. 7A to 7D, which is drawings for explaining the buck operation. An explanation will be made for the voltage buck mode (regeneration mode) of the DC/DC converter 1 in the present invention. For example, in a case where a motor is used as a load on the output side, and the motor is controlled to decrease the speed of rotation (operation of regeneration brake), when the voltage on the output side (load) increases, bucking down the voltage on the output side (load) charges the power supply such as a battery on the input side in which the energy is returned to the input side).

FIGS. 7A to 7D are drawings for explaining the operations of the voltage buck mode (regeneration mode). In the regeneration mode, the DC/DC converter 1 always keeps OFF the switch SW2 at the IGBT portion 3 and the switch SW3 at the IGBT portion 5, and controls the switch SW1 at the IGBT portion 3 and the switch SW4 at the IGBT portion 5 so as to be alternately turned ON and OFF.

In the DC/DC converter 1, where the bucking down ratio is high, in other words, where the regeneration load is large and the regeneration voltage is high, for example, where the voltage ratio applied to the power supply Eg (voltage of the outputting circuit) on regeneration shown in FIG. 7A and to the load Rg (power supply of the DC power supply input circuit) is approximately in a range of "1:0.5" to "1:0.8", the switch SW1 and the switch SW4 are alternately turned ON and OFF, and the capacitor C1 and the capacitor C2 are alternately turned ON and OFF.

First, will be described operations where the switch SW1 is turned ON to discharge the regeneration electric charge stored in the capacitor C1 with reference to FIG. 7A and FIG. 7B. In the DC/DC converter 1, at time t1, when the switch SW1 is turned ON (others such as the switch SW2, switch SW3 and switch SW4 are turned OFF), a current I1 flows through a route of the capacitor C1→the switch SW1→the inductor L→the load Rg→the flywheel diode D3→the capacitor C1. In this instance, the load Rg (power supply of the DC power supply input circuit) is charged by the capacitor C1 (see I1: C1 discharged current waveform in FIG. 7B). Further, at this time, a magnetic energy is stored in the inductor L.

Then, in the DC/DC converter 1, at time t2, when the switch SW1 is turned OFF (others such as switch SW2, switch SW3 and switch SW4 are also OFF), a charging current I2 resulting from the magnetic energy stored in the inductor L flows through a route of the inductor L→the load Rg→the flywheel diode D3→the flywheel diode D2→the inductor L (see I2: L discharged current waveform in FIG. 7B).

As described above, in the DC/DC converter 1, regenerated electricity stored in the capacitor C1 is returned to the power supply to buck down the voltage of the capacitor C1.

Next, will be described discharge operations of the capacitor C2 with reference to FIG. 7C and FIG. 7D. In the DC/DC converter 1, at time t3, when a gate voltage is applied to the switch SW4 inside the IGBT portion 5 and the switch SW4 is turned ON (others such as switch SW1, switch SW2 and switch SW3 are OFF), a discharged current I3 flows through a route of the capacitor C2→the flywheel diode D2→the inductor L→the load Rg→the switch SW4→the capacitor C2. At this time, the load Rg (power supply of the DC power supply input circuit) is charged by the capacitor C2 (see I3: C2 discharged current waveform in FIG. 7D). Further, at this time, a magnetic energy is stored in the inductor L.

Then, in the DC/DC converter 1, at time t4, when the switch SW4 is turned OFF (others such as switch SW1, switch SW2 and switch SW3 are OFF), charging current I4 resulting from the magnetic energy stored in the inductor L flows through a route of the inductor L→the load Rg→the flywheel diode D3→the flywheel diode D2→the inductor L (see I4: L discharged current waveform in FIG. 7D).

As described above, in the DC/DC converter 1, regenerated electricity stored in the capacitor C2 is returned to the power supply to buck down the voltage of the capacitor C2.

Therefore, in the DC/DC converter 1, the capacitor C1 and the capacitor C2 are alternately discharged, which returns regenerated electricity from the regeneration load connected to an outputting circuit to the input circuit. In addition, when the voltage of the outputting circuit is increased with an increase in regenerated electricity, so that electricity to be returned (outputting circuit→DC power supply input circuit) increases, only the regenerated current increases with the duty ratio kept always constant.

Figure 8A:
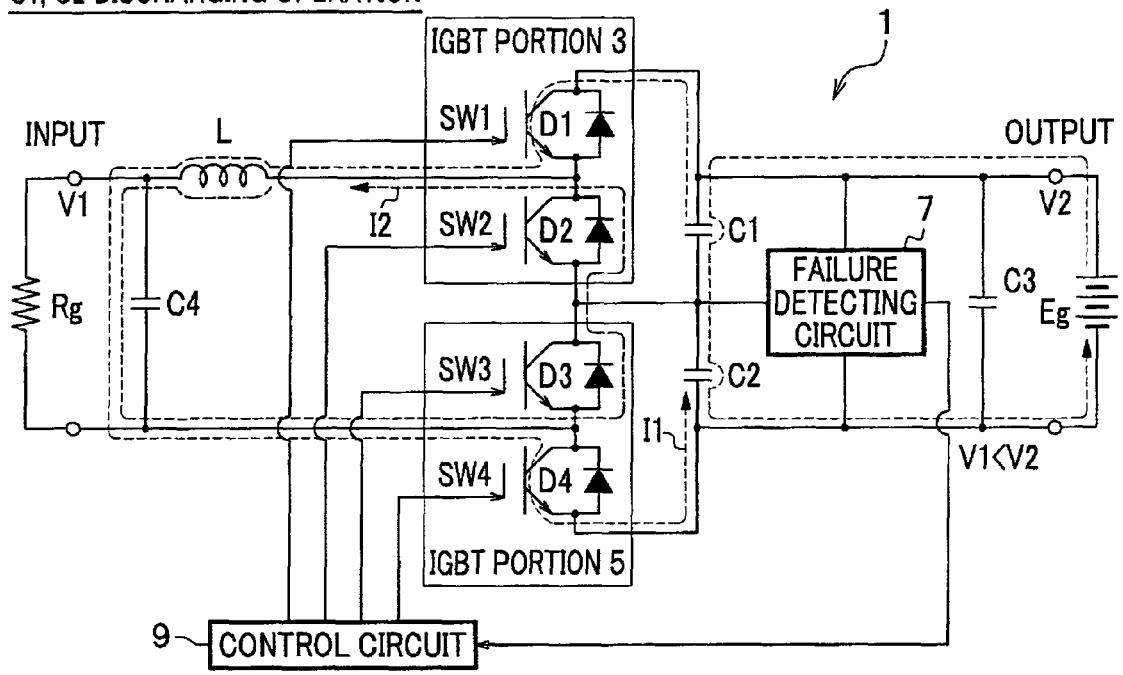
FIGS. 8A and 8B are drawings for explaining operations where the bucking down ratio is low (regeneration load is small)
Figure 8B:
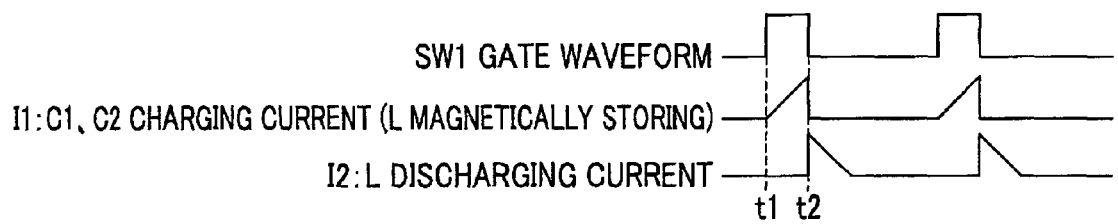

Further, FIG. 8 is a drawing for explaining operations where the bucking down ratio is low (regeneration load is small). In the DC/DC converter 1, where the bucking down ratio is low, for example, where the voltage ratio applied to the power supply Eg (voltage of the outputting circuit) on regeneration shown in FIG. 8 and to the load Rg (power supply of DC power supply input circuit) is approximately in a range of "1:0.8" to "1:1", the switch SW2 and the switch SW3 are turned OFF, the switch SW4 is kept always ON and only the switch SW1 is turned ON and OFF, thereby controlling the switches.

First, in the DC/DC converter 1, at time t1, when the switch SW1 is turned ON, a current I1 flows through a route of the capacitor C1→the switch SW1→the inductor L→the load Rg→the switch SW4→the capacitor C2. In this instance, the load Rg (power supply of DC power supply input circuit) is charged by the capacitor C1 and the capacitor C2 (see I1: C1, C2 discharged current waveform in FIG. 8B). Further, at this time, a magnetic energy is stored in the inductor L.

Then, in the DC/DC converter 1, at time t2, when the switch SW1 is turned OFF, a charging current I2 caused from the magnetic energy stored in the inductor L flows through a route of the inductor L the load Rg→the flywheel diode D3→the flywheel diode D2 (see I2: L discharged current waveform in FIG. 8B).

Therefore, the DC/DC converter 1 can regenerate only by controlling turning ON and OFF of the switch SW1 when the bucking down ratio is low (regeneration load is small).

Figure 9A:
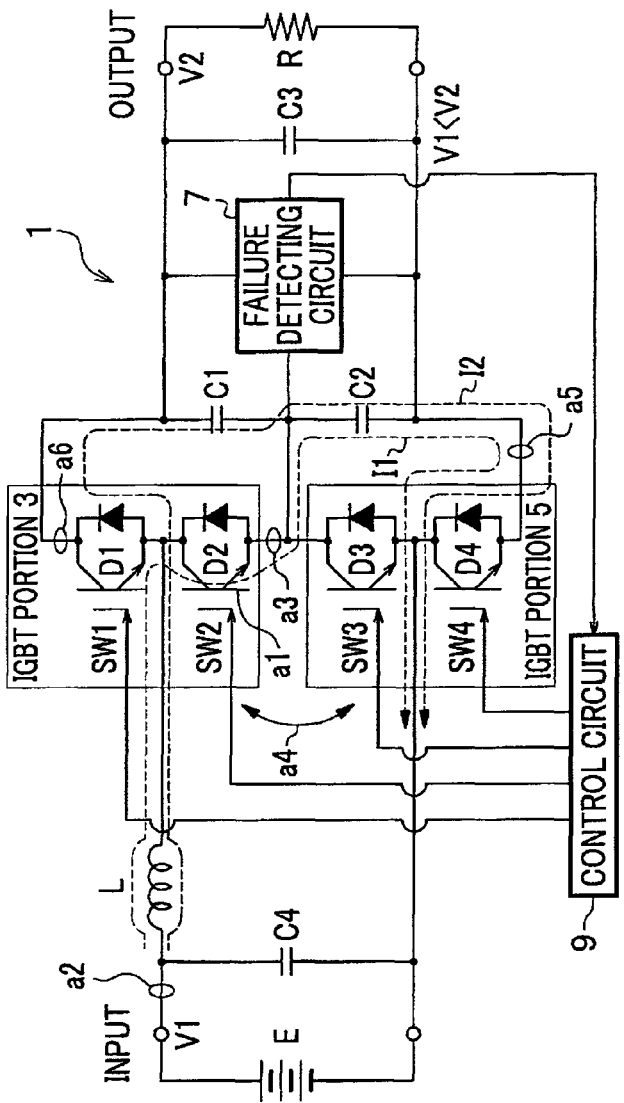
FIGS. 9A and 9D are drawings for showing an example of determining waveforms at various portions of the power converter in FIG. 1, showing waveforms on boost operation.
Figure 9B:
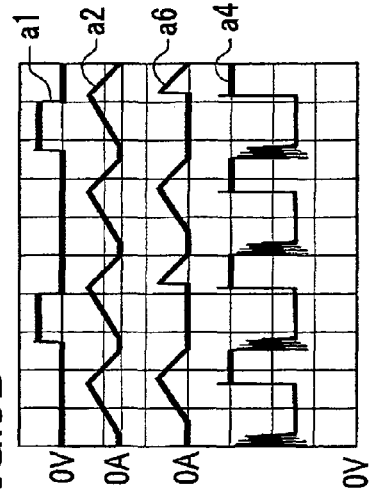
Figure 9C:
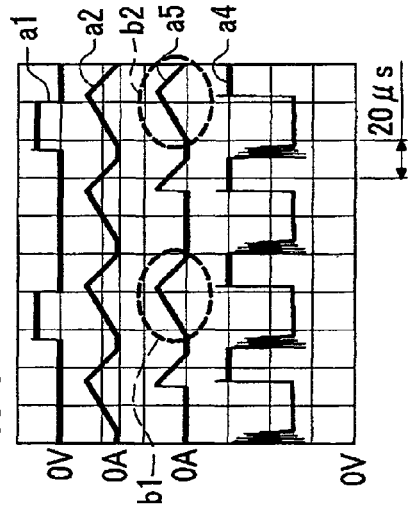
Figure 9D:
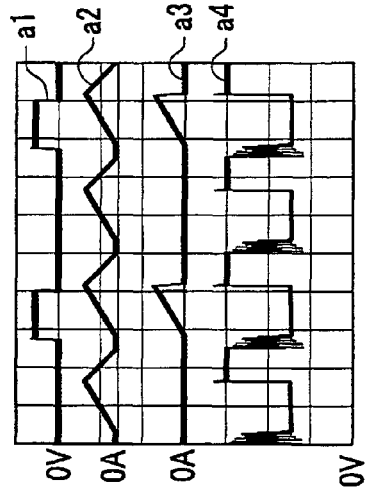

FIGS. 9B to 9D are drawings for showing an example of waveforms in an actual circuit to which the present invention is applied, or a drawing showing the waveforms on boost operation (see FIGS. 5A to 5D).

In FIGS. 9A to 9D, a reference a1 denotes a gate waveform for turning the switch SW2 ON and OFF and also denotes a measured place in FIG. 9A; a reference a2, a current waveform flowing from the DC power supply input circuit to the circuit and also a measured place in FIG. 9A; a reference a3, a current waveform of the switch SW2 and also a measured place in FIG. 9A; a reference a4, a voltage waveform between the output side of the inductor L and the negative pole of the DC power supply input circuit and also a measured place in FIG. 9A; a reference a5, a current waveform of the switch SW4 and also a measured place in FIG. 9A; and a reference a6, a current waveform of the switch SW1 and also a measured place in FIG. 9A.

In addition, the current waveforms b1 and b2 of a current at the place a5 circled in FIG. 9A are waveforms in which the current a3 and the current a6 are added.

[Operations on Failure Detection]

Next, will be described operations when the capacitor C1 or the capacitor C2 is short-circuited (on the occurrence of failure) on the boost operation or the buck operation of the DC/DC converter 1 with reference to FIGS. 10A to 10H. FIGS. 10A to 10H are drawings which show a relationship in time base between the transition of the junction voltage E from t0 (on occurrence of failure of the capacitor C1 or on occurrence of failure of the capacitor C2), the outputs of the comparator CO1 and the comparator CO2, and the output of a failure signal (stop output). In addition, in FIGS. 10A and 10E, voltages A, B, C and D correspond to each of the junction points A, B, C and D, and a span between points A and B denotes a voltage across the resistor R1, a span between points B and C denotes a voltage across the resistor R2, and a span between CD denotes a voltage across to the resistor R3.

As shown in FIG. 10A, at time t1, when any failure occurs in the capacitor C1, the junction voltage E starts to increase and exceeds an upper limit of the set range after Δt1. Then, a response (comparator CO1 output "1") is outputted from the comparator CO1 to indicate that the capacitor C1 is short-circuited (occurrence of failure), while the output of the comparator CO2 is low. Then, NOR is taken for responses from the comparator CO1 and comparator CO2 at the NOR gate NG1 of the failure detecting circuit 7, and a failure signal is generated when a response is outputted from at least one of the comparator CO1 and comparator CO2.

Further, at time t2 when a failure occurs in the capacitor C2, the junction voltage E starts to decrease and becomes lower than a lower limit of the set range after Δt2. Then, a response (comparator CO2 output "1") is outputted from the comparator CO2 to indicate that the capacitor C2 is short-circuited (occurrence of failure), while the comparator CO1 output a low level. Then, NOR is taken for a response from the comparator CO1 and comparator CO2 at the NOR gate NG1 of the failure detecting circuit 7 and a failure signal is provided where a response is outputted from at least one of the comparator CO1 and comparator CO2.

[Example of Circuit for Multiport Power Converter]

Next, will be described an example circuit for multiple input power converter with reference to FIG. 11.

Figure 11:
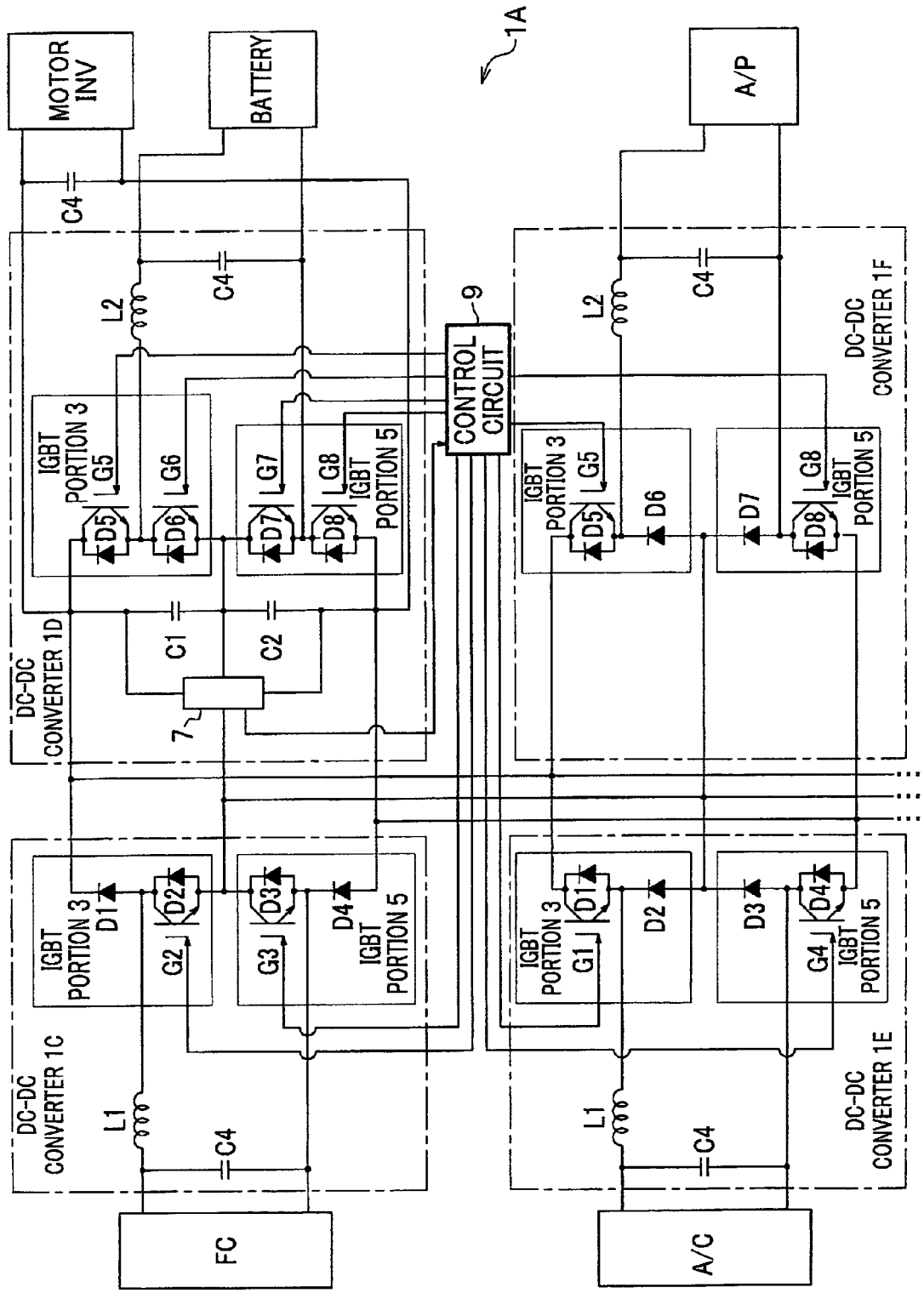
FIG. 11 is a drawing showing an example of a circuit for a multiport power converter.

As shown in FIG. 11, a multiple input/output power converter (multi-port power converter) 1A outputs the input voltage through the operations of boost, buck and conduction, in which the serially connected capacitor C1 and capacitor C2 are commonly used by four DC-DC converters 1C, 1D, 1E, 1F. Then, even in this instance, the power converter 1A is provided with a failure detecting circuit 7 for detecting a junction voltage of the capacitor C1 and the capacitor C2 to detect the occurrence of failure with reference to any change in the junction voltage, thus making it possible to detect a failure of the capacitor C1 and that of the capacitor C2. Further, where a failure signal is outputted from the failure detecting circuit 7, a control circuit 9 can stop the boost operation or the buck operation. In addition, the details of the circuit of the failure detecting circuit 7 are the same as those explained previously, an explanation of which will be omitted here.

Moreover, the DC-DC converter C is connected to a FC (fuel cell), and the DC-DC converter D is connected to a motor INV (inverter of motor) and a battery (for example, 12V direct-current power supply). The DC-DC converter 1E is connected to an A/C (air conditioner), and the DC-DC converter 1F is connected to an A/P (accessory part).

[Appendix (explanation of impossibility in detecting a failure by using electric current)]

In the DC/DC converter 1 of the present invention, any failure is detected with reference to a variation in the junction voltage of the capacitor C1 and the capacitor C2 connected in series. However, due to the following reasons, it is impossible to detect a failure, for example, with reference to change in current of the inductor L. This case will be explained with reference to FIGS. 12A to 12C.

Where, for example, the capacitor C2 fails, it is impossible to detect the failure of the capacitor C2 due to a fact that there is substantially no difference in inclination between the change in current of inductor L1 when the high-side gate (SW3) at the IGBT portion S is turned ON and the change in current of inductor L1 when the lower side gate (SW2) at the IGBT portion 3 is turned ON.

Further, if the IGBT portion 3 and the IGBT portion 5 are switched, as they are, switching by the high-side gate (SW3) at the IGBT portion 5 will fail in charging the capacitor C1, only resulting in an intermittent charge of the capacitor C1 from voltage stored in the inductor L1 due to switching by the low-side gate (SW2) at the IGBT portion 3. Thus, no sufficient voltage boosting is attained in the same duty to result in a drastic bucking-down in output voltage. Thereby, a system for detecting any failure from a change in current will not work. In order to detect a change in the current, it is necessary to monitor the voltage boosting ratio constantly with reference to duty and input/output voltage, resulting in complicated procedures. With the above description taken into account, the DC/DC converter 1 of the present invention, which detects a junction voltage of the capacitor C1 and the capacitor C2 connected in series, can detect any failure of the capacitor C1 and the capacitor C2 more simply and reliably.

As explained so far, in the DC/DC converter 1, the failure detecting circuit 7 is used to detect a junction voltage of the capacitor C1 and the capacitor C2 connected in series, thereby making it possible to detect any failure of the capacitor C1 and the capacitor C2. Further, even in a multiple input power converter such as a multi-port power converter 1A, the use of only one failure detecting circuits 7 can miniaturize the converter as a whole and also detect short circuits of the capacitor C1 and the capacitor C2. Then, the failure detecting circuit 7 outputs a failure signal to stop the boosting or bucking down of voltage by using the control circuit 9, thus making it possible to stabilize the output voltage.

An explanation has been so far made for embodiments of the present invention. However, the present invention is unlimited to these embodiments. For example, in the present embodiment, an explanation has been made for a case where the inductor L is on the positive side of a power supply. Similar functions and effects can be provided, when the inductor L is on the negative side of a power supply. Further, in these embodiments, an explanation has been made for a case where the capacitor C1 and the capacitor C2 are a ceramic capacitor. However, other capacitors such as a film capacitor may be used.

Further, according to the present invention, if it is desired to prevent an unnecessary regeneration, a regeneration prevented mode can be provided. In the regeneration prevented mode, the switches SW1 and SW4 are always kept OFF and the respective flywheel diodes are allowed to function.

Still further, the DC/DC converter 1 of the present invention shall not be limited to examples illustrated above but, as a matter of course, may be modified in various ways as long as not departing from the scope of the present invention. For example, it is also possible to apply the principle of the present invention to a boost circuit for outputting a voltage three times or higher than the input voltage.

Furthermore, the present invention is not only able to make a variable boost type DC/DC converter smaller in size, lighter in weight and lower in price but also effective in converting electricity at a higher efficiency. Therefore, the present invention is applicable to the input of an inverter in which a solar cell generates electricity from sunlight to cause boosting of the generation voltage up to a system voltage (FC (fuel cell), this is also true for wind power generation), the boosting of voltage for driving a motor such as a hybrid system used in automobiles, a system, which uses a load requiring a voltage greater than that of a battery in general, a movable body such as an automobile, electrical home appliances to be installed at a small place and the like.

The invention claimed is:

1. A power converter comprising:
   a plurality of switches;
   first and second capacitors connected in series, wherein the first and second capacitors are connected to the switches and each of the first and second capacitors are alternately charged and discharged; and
   a control circuit for controlling switching of the switches between ON and OFF to perform any one of a boost operation, a buck operation, and a conducting operation, of an input voltage to have an output voltage; and
   a failure detecting circuit for detecting a voltage at a junction of the first and second capacitors connected in series and generating a failure signal when the detected voltage is higher than a predetermined voltage range and when the voltage is lower than a predetermined voltage range, the control circuit stopping one of the boost operation and the buck operation performed to have the output voltage in response to the failure signal.

2. The power converter as claimed in claim 1, wherein the operations includes a conducting operation and the control circuit performs the conducting operation of the input voltage in response to the failure signal.

3. A power converter comprising:
   a first input-output circuit;
   first and second capacitors connected in series, wherein each of the first and second capacitors are alternately charged and discharged;
   a second input-output circuit connected to the first and second capacitors;
   an inductor connected to either of a positive terminal side or a negative terminal side of the first input-output circuit;
   a first switch for selectively connecting a positive terminal side of the first input-output circuit to a positive terminal of the first capacitor and a positive terminal side of the second input-output circuit;
   a second switch for selectively connecting the positive terminal of the first input-output circuit to a negative terminal of the first capacitor and a positive terminal of the second capacitor;
   a third switch for selectively connecting a negative terminal side of the first input-output circuit to the negative terminal of the first capacitor and the positive terminal of the second capacitor;
   a fourth switch for selectively connecting the negative terminal side of the first input-output circuit to a negative terminal of the second capacitor and the negative terminal side of the second input-output circuit;
   a control circuit for controlling switching of the first to fourth switches between ON and OFF in any one of operations including a boost operation and a buck operation, of an input voltage to have an output voltage; and
   a failure detecting circuit for detecting a voltage at a junction of the first and second capacitors connected in series and generating a failure signal when the voltage is higher than a predetermined voltage range and when the voltage is lower than a predetermined voltage range, the control circuit stopping one of the boost operation and the buck operation performed to have the output voltage in response to the failure signal.

4. A power converter comprising:
   an input circuit;
   first and second capacitors connected in series, wherein each of the first and second capacitors are alternately charged and discharged;
   an output circuit connected to the first and second capacitors;
   an inductor connected to either of a positive terminal side or a negative terminal side of the input circuit;
   a first switch for selectively connecting a positive terminal side of the input circuit to a positive terminal of the first capacitor and a positive terminal of the second capacitor;
   a second switch for selectively connecting a negative terminal side of the input circuit to the negative terminal of the first capacitor and the positive terminal of the second capacitor;
   a control circuit for controlling switching of the first and second switches between ON and OFF in a boost operation of an input voltage; and
   a failure detecting circuit for detecting a voltage at a junction of the first and second capacitors connected in series and generating a failure signal when the voltage is higher than a predetermined voltage range and when the voltage is lower than a predetermined voltage range, the control circuit stopping the boost operation,
   wherein the operations includes a conducting operation and the control circuit performs the conducting operation of the input voltage in response to the failure signal.

5. A power converter comprising:
   an output circuit;

first and second capacitors connected in series, wherein each of the first and second capacitors are alternately charged and discharged;
an input circuit connected to the first and second capacitors;
an inductor connected to either of a positive terminal side or a negative terminal side of the output circuit;
a first switch for selectively connecting the positive terminal side of the output circuit to a positive terminal of the first capacitor and a positive terminal side of the input circuit;
a second switch for selectively connecting the negative terminal side of the output circuit to a negative terminal of the first capacitor and a negative terminal side of the input circuit;
a control circuit for controlling switching of the first and second switches between ON and OFF in a buck operation of an input voltage; and
a failure detecting circuit for detecting a voltage at a junction of the first and second capacitors connected in series and generating a failure signal when the voltage is higher than a predetermined voltage range and when the voltage is lower than a predetermined voltage range, the control circuit stopping the buck operation in response to the failure signal,
wherein the operations includes a conducting operation and the control circuit performs the conducting operation of the input voltage in response to the failure signal.

6. The power converter comprising as claimed in claim 1, wherein the control circuit performs the conducting operation of the input voltage in response to the failure signal.

7. The power converter comprising as claimed in claim 3, wherein the operations includes a conducting operation and the control circuit performs the conducting operation of the input voltage in response to the failure signal.

8. A multiport power converter comprising:
at least two input-output circuits;
a plurality of capacitors, wherein each of the plurality of capacitors are alternately charged and discharged;
a plurality of inductors;
a plurality of power converting circuits, including switches;
a control circuit for controlling switching of the switches in accordance with predetermined switching patterns to perform a plurality of operation modes to selectively use the inductors and the capacitors to perform any one of a boost operation, a buck operation, and a conducting operation, of an input voltage to have an output voltage, wherein the capacitors are shared among the power converting circuits; and
a failure detecting circuit for detecting a voltage at a junction between two of the capacitors and generating a failure signal when the voltage is higher than a predetermined voltage range and when the voltage is lower than a predetermined voltage range, the control circuit stopping one of the boost operation and the buck operation performed to have the output voltage in response to the failure signal.

9. A multiport power converter comprising:
at least two input-output circuits;
a capacitor unit;
a plurality of inductors; and
a plurality of power converting circuits,
wherein the capacitor unit is shared among the power converting circuits,
wherein at least one of the power converting circuits comprises a buck-boost power converting circuit,
wherein the at least two input-output circuits comprises first and second input-output circuits,
wherein the capacitor unit comprises a first and second capacitors connected in series, wherein each of the first and second capacitors are alternately charged and discharged,
wherein buck-boost power converting circuit comprises:
a first switch for selectively connecting a positive terminal side of the first input-output circuit to a positive terminal of the first capacitor and a positive terminal side of the second input-output circuit;
a second switch for selectively connecting the positive terminal side of the first input-output circuit to a negative terminal of the first capacitor and a positive terminal of the second capacitor;
a third switch for selectively connecting a negative terminal side of the first input-output circuit to the negative terminal of the first capacitor and the positive terminal of the second capacitor; and
a fourth switch for selectively connecting the negative terminal side of the first input-output circuit to a negative terminal of the second capacitor and the negative terminal side of the second input-output circuit, the multiport power converter further comprising:
a control circuit for controlling switching of the first to fourth switches between ON and OFF in any one of operations including a boost operation and a buck operation, of an input voltage to have an output voltage; and
a failure detecting circuit for detecting a voltage at a junction of the first and second capacitors connected in series and generating a failure signal when the voltage is higher than a predetermined voltage range and when the voltage is lower than a predetermined voltage range, the control circuit stopping one of the boost operation and the buck operation performed to have the output voltage in response to the failure signal.

10. A multiport power converter comprising:
at least two input-output circuits;
a capacitor unit;
a plurality of inductors;
a plurality of power converting circuits, including switches; and
a control circuit for controlling switching of the switches in accordance with predetermined switching patterns to perform a plurality of operation modes to selectively use the inductors and the capacitor unit to perform any one of operations including a boost operation, a buck operation, and a conducting operation,
wherein the capacitor unit is shared among the power converting circuits,
wherein at least one of the power converting circuits comprises a boost power converting circuit,
wherein the at least two input-output circuits comprises first and second input-output circuits,
wherein the capacitor unit comprises a first and second capacitors connected in series, wherein each of the first and second capacitors are alternately charged and discharged,
wherein the switches comprise:
a first switch for selectively connecting a positive terminal side of the first input-output circuit to a negative terminal of the first capacitor and a positive terminal of the second capacitor;
a second switch for selectively connecting the negative terminal side of the first input-output circuit to a negative terminal of the first capacitor and a positive terminal of the second capacitor, the multiport power converter further comprising:
a control circuit for controlling switching of the first and second switches between ON and OFF for a boost operation, of an input voltage to have an output voltage; and
a failure detecting circuit for detecting a voltage at a junction of the first and second capacitors connected in series and generating a failure signal when the voltage is higher than a predetermined voltage range and when the voltage is lower than a predetermined voltage range, the control circuit stopping the boost operation performed to have the output voltage in response to the failure signal.

11. A multiport power converter comprising:
at least two input-output circuits;
a capacitor unit;
a plurality of inductors;
a plurality of power converting circuits, including switches; and
a control circuit for controlling switching of the switches in accordance with predetermined switching patterns to perform a plurality of operation modes to selectively use the inductors and the capacitor unit to perform any one of operations including a boost operation, a buck operation, and a conducting operation, of an input voltage to have an output voltage,
wherein the capacitor unit is shared among the power converting circuits,
wherein at least one of the power converting circuits comprises a buck power converting circuit,
wherein the at least two input-output circuits comprises first and second input-output circuits,
wherein the capacitor unit comprises a first and second capacitors connected in series, wherein each of the first and second capacitors are alternately charged and discharged
wherein the switches comprise:
a first switch for selectively connecting a positive terminal side of the first input-output circuit to a positive terminal of the first capacitor and a positive terminal side of the second input-output circuit; and
a second switch for selectively connecting a negative terminal side of the first input-output circuit to a negative terminal of the second capacitor and a negative terminal side of the second input-output circuit, the multiport power converter further comprising:
a control circuit for controlling switching of the first and second switches between ON and OFF; and
a failure detecting circuit for detecting a voltage at a junction of the first and second capacitors connected in series, generating a failure signal when the voltage is higher than a predetermined voltage range and when the voltage is lower than a predetermined voltage range, and controlling the control circuit to stop the buck operation performed to have the output voltage in response to the failure signal.

12. The power converter comprising as claimed in claim 8, wherein the control circuit performs the conducting operation of the input voltage in response to the failure signal.

13. The power converter comprising as claimed in claim 9, wherein the operations includes a conducting operation and the control circuit performs the conducting operation of the input voltage in response to the failure signal.

14. The power converter comprising as claimed in claim 10, wherein the operations includes a conducting operation and the control circuit performs the conducting operation of the input voltage in response to the failure signal.

15. The power converter comprising as claimed in claim 11, wherein the operations includes a conducting operation and the control circuit performs the conducting operation of the input voltage in response to the failure signal.

* * * * *